(12) United States Patent
Wu et al.

(10) Patent No.: US 11,071,064 B1
(45) Date of Patent: Jul. 20, 2021

(54) DYNAMIC LOW-POWER SCHEME FOR WIRELESS TRANSCEIVERS

(71) Applicant: Amazon Technologies, Inc., Seattle, WA (US)

(72) Inventors: Songping Wu, Palo Alto, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 16/745,021

(22) Filed: Jan. 16, 2020

Related U.S. Application Data (60) Provisional application No. 62/896,976, filed on Sep. 6, 2019.

(51) Int. Cl.
| | |
|---|---|
| *H04W 88/06* | (2009.01) |
| *H04W 52/02* | (2009.01) |
| *H04B 17/318* | (2015.01) |
| *H04B 1/40* | (2015.01) |
| *H04W 52/20* | (2009.01) |
| *H04L 1/00* | (2006.01) |
| *H04W 52/24* | (2009.01) |
| *H04L 1/20* | (2006.01) |

(52) U.S. Cl.
CPC ......... *H04W 52/0245* (2013.01); *H04B 1/40* (2013.01); *H04B 17/318* (2015.01); *H04L 1/0026* (2013.01); *H04L 1/20* (2013.01); *H04W 52/20* (2013.01); *H04W 52/241* (2013.01); *H04W 52/245* (2013.01); *H04W 88/06* (2013.01)

(58) Field of Classification Search
CPC ........... H04W 72/085; H04W 28/0268; H04W 36/30; H04W 72/1231; H04W 84/12; H04W 88/06; H04W 52/028
See application file for complete search history.

(56) References Cited

U.S. PATENT DOCUMENTS

| | | | |
|---|---|---|---|
| 7,061,997 B1 | 6/2006 | Eberlein et al. | |
| 2008/0056305 A1 | 3/2008 | Medvedev et al. | |
| 2008/0181155 A1* | 7/2008 | Sherman ........... | H04W 52/0229 370/311 |

* cited by examiner

*Primary Examiner* — Tu X Nguyen
(74) *Attorney, Agent, or Firm* — Lowenstein Sandler LLP (57) ABSTRACT

Technologies directed to improving power for wireless transceivers are described. One method receives, in a low power mode, a data packet over a wireless link and determines a RSSI value and a receive signal quality indicator (RSQI) value. The method stores a record with the RSSI and RSQI values in memory. The method determines an average RSSI value and an average RSQI value from historical RSSI and RSQI values, respectively, stored in records. The method categorizes received data in a first channel quality indicator (CQI) category using the average RSSI value and the average RSQI value and configures the wireless device to operate in another power mode, responsive to the data being in the first CQI. The method processes a subsequent data packet while in the other power mode. In some cases, the other power mode is less than a maximum power mode specified by a wireless standard.

20 Claims, 5 Drawing Sheets

FIG. 1

| Category | RSQI (thres: A) | RSSI (Thres: B) | CQI result | Power modes |
|---|---|---|---|---|
| 1 _202_ | >A | >B | interference light, short distance | Tx: PA backoff, Rx: low power _222_ |
| 2 _204_ | >A | <=B | interference light, long distance | Tx: PA full power, Rx: full power _224_ |
| 3 _206_ | <=A | >B | interference heavy, short distance | Tx: PA full power, Rx: low power _226_ |
| 4 _208_ | <=A | <=B | weak signal, long distance | Tx: PA full power, Rx: full power _228_ |

DYNAMIC LOW-POWER SCHEME FOR WIRELESS TRANSCEIVERS

RELATED APPLICATIONS

This application claims the benefit of Provisional Application No. 62/896,976, filed Sep. 6, 2019, the entire content is hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to improving power for wireless transceivers are described. The Bluetooth® wireless technology has been widely adopted across the consumer industry in many consumer products, including smart phones, smart wearable, wireless speakers, etc. One of the problems with all mobile consumer electronics is that they rely on the battery to operate. Therefore, the battery life has been a consistent topic in terms of customer experience. Wireless connectivity, including the Bluetooth® transceiver, contributes to a significant part of power consumption to these mobile devices. Therefore, the optimization of their power consumption is an important part of the formula that aims to optimize the battery life.

The Bluetooth® technology operates in both ways, with the power consumption from both transmitter (TX) and receiver (RX). A significant part (typically around 50%) of TX power consumption comes from its RF power amplifier (PA) due to its low efficiency. RX power consumption comes from RF and baseband signal processing, central processing unit (CPU) protocol processing, and peripherals. Conventionally, Bluetooth® technology can save power by dividing its operations into a few modes, including active mode, sniff mode, hold and park mode, where the sniff, hold and park modes indicates lower levels of activities by setting the nodes into standby (sniff), sleep (hold) or deep sleep (park) modes with extended duty cycle and reduced packet lengths. With each power mode, the TX or RX keeps a constant power consumption when dealing with the whole packet. While this helps power management, the power management is not optimized.

Aspects of the present disclosure overcome the deficiencies of conventional power management techniques by extending the power saving into each physical packet. Aspects of the present disclosure develop an in-packet dynamic power adaptation with the analysis of current received signal characteristics shown in its preamble and data and perform a corresponding adjustment of power consumption for the subsequent TX/RX packets. A preamble of a data packet, as used herein, refers to a portion of the data packet that precedes a data payload of the data packet. The preamble includes at least an access code section and a header section that are transmitted before a payload section. The access code section can include a preamble, a sync word, and an optional trailer. The access code can be used for timing synchronization, offset compensation, paging, and inquiry. In Bluetooth® technology, there can be three access code, including a Channel Access Code (CAC) that is used for identifying a master device, a Device Access Code (DAC) that is used identifying a paged device in paging or response to paging, and Inquiry Access Code (IAC) that is used for inquiry purposes. The access code section can include information about the physical channel access code, whereas the header section contains information about a logical link layer, such as a logical transport identifier, a logical link identifier, and a link control protocol. The payload section includes the data being transmitted. A basic rate (BR) packet includes the access code section, the header section, and the payload section. An enhanced data rate (EDR) packet includes the access code section, the header section, a guard section, a sync section, a payload header section, a EDR payload section, and a trailer. One key feature of the EDR packet is that the modulation scheme is changed within the data packet. The first two section of the data packet, including the access code and the header sections, are transmitted using Gaussian Frequency shift keying (GFSK) modulation and the remaining sections of the data packet after the guard section are transmitted using Differential Phase Shift Keying (DPSK), such as pi/4-DQPSK or 8-DPSK depending on the data rate of the wireless link.

Aspects of the present disclosure can further optimize the power consumption as it improves the precision of power adaptation by zooming into the fine details of each physical packet. The rationale behind this optimization is that of a dynamic environment, multiple access, and interference. For the dynamic environment, the over-the-air (OTA) communication channel is changing all the time due to device mobility. While the power scheme is simple to have a constant power scheme for TX and RX processing over a long period, it is suboptimal. For example, when communication distance is short between two Bluetooth® compatible devices, the signals seen at both sides are strong with high quality, aspects of the present disclosure can switch to a lower power processing mode where some advanced processing circuit can be turned off with worse sensitivity but still provide a good margin to achieve sufficient communications quality. For multiple access, there can be a lot of traffic over the air. A Bluetooth® receiver can accidently pick up traffic belonging to another Bluetooth® link and find out later after full-power processing it for a while. The aspects of the present disclosure can avoid this situation by checking the packet signature through its preamble (e.g., access code section) and developing an early intervention when the packet signature does not match. For interference, the wireless frequency bands at 2.4 GHz can be very crowded with many WiFi®/Bluetooth®/ZigBee® devices. When there is a strong interference nearby that corrupts the Bluetooth® transmission, the Bluetooth® transceiver does not need to waste power to decode the OTA packet if it knows it's fully corrupted and cannot be recovered.

One method receives a data packet over a wireless link, while in a low power mode, and determines a receive signal strength indicator (RSSI) value and a receive signal quality indicator (RSQI) value for the data packet. The method stores a record with the RSSI and RSQI values in a memory device. The method categorizes data received over the wireless link in a first channel quality indicator (CQI) category and configures the wireless device to operate in another power mode, responsive to the categorizing in the first CQI category. The method processes a subsequent data packet in received over the wireless link while in the other power mode. In some cases, the other power mode is less than a maximum power mode specified by a wireless standard (e.g., Bluetooth® standard).

Figure 1:
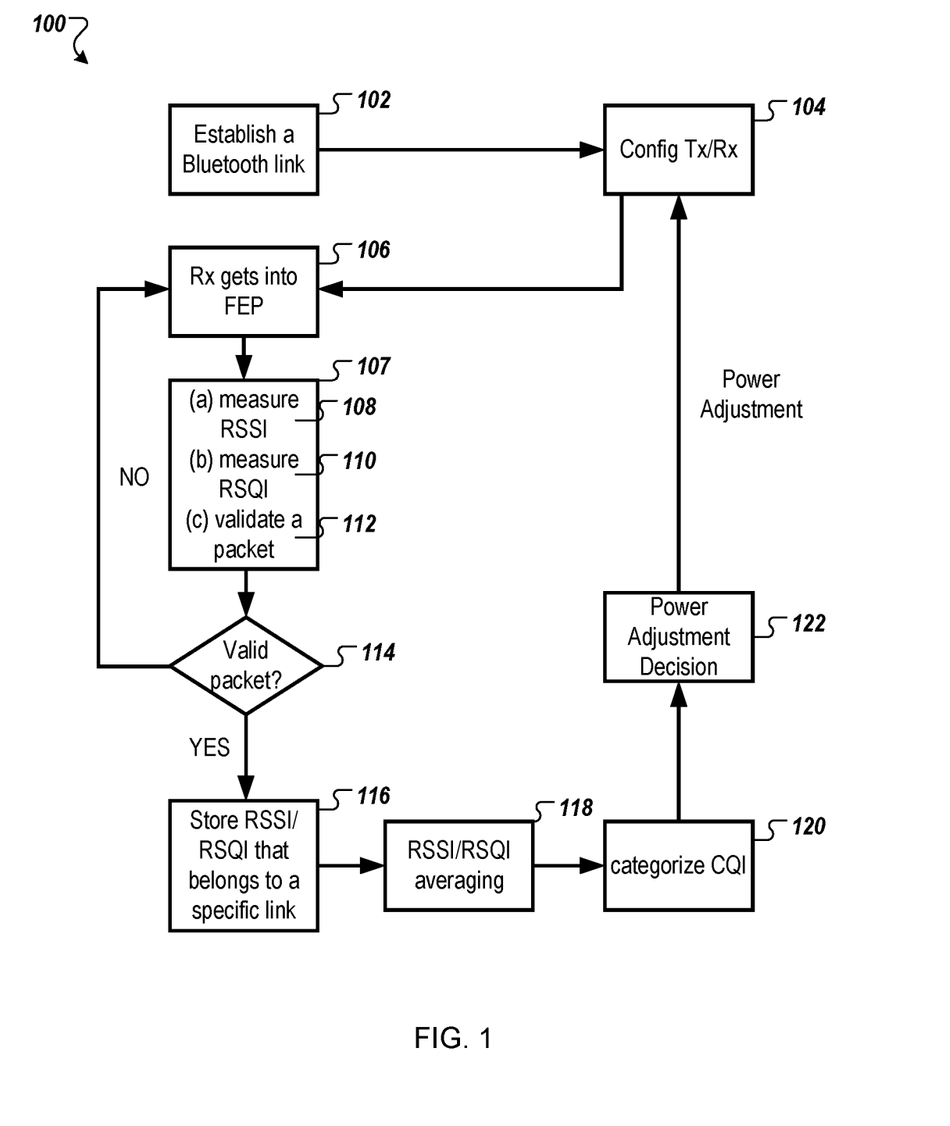
FIG. 1 is a functional diagram of a wireless device with a power adjustment categorization and decision logic according to one embodiment.

FIG. 1 is a functional diagram of a wireless device 100 with a power adjustment categorization and decision logic according to one embodiment. The wireless device 100 includes radio frequency front-end (RFFE) circuitry, a memory device, and a processing device coupled to the RFFE circuitry and the memory device. The RFFE circuitry is coupled to an antenna and can include various components, including an analog-to-digital converter (ADC), a low noise amplifier (LNA), a power amplifier (PA), or the like. The RFFE circuitry can also include a mixer, a filter, or the like. The wireless device 100 can establish a wireless link (e.g., Bluetooth® link) (block 102). The RFFE circuitry can start to receive a data packet via an antenna as part of a transmission over the wireless link. That is, the RFFE circuitry receives a first RF signal and generates a second RF signal by amplifying, filtering, and down-converting a frequency of the first RF signal. The ADC converts the second RF signal to digital data of the data packet. In another embodiment, the ADC is part of the processing device. The processing device determines whether the data packet should be decoded (block 114). Before determining whether the data packet should be decoded, the processing device configures default settings to start the communication (block 104), including configuring settings for baseband circuitry, the RFFE circuitry, and a central processing unit (CPU). The baseband circuitry can include one or more transmit (TX) signal processing blocks, one or more receive (RX) signal processing blocks, a first signal processing block (referred to herein as "an access code detection" signal processing block, or any combination thereof. The first signal processing block can be a dedicated signal processing block that performs operations in connection with access code correlation, as described herein. The first signal processing block can be separated from a TX signal processing block and a RX signal processing block so that power supplied to these separate signal processing blocks can be individually controlled. The processing device, before it starts transmission in a RX mode, configures the wireless device to operate in a front-end processing (FEP) mode (block 106) in which only RFFE circuitry, CPU, and access code detection signal processing block are turned on and all the other baseband circuitry, and peripheral devices can be powered off. The CPU can be in a lower power mode, such as an idle mode, in which the CPU is used only when needed, such as to determine the average RSSI value and the average RSQI value and the CQI category, as described herein. Therefore, the FEP mode is a low-power mode compared with a full active power mode of the wireless device. The full active power mode is a maximum power mode in which the components operate according to maximum power levels.

In the low-power FEP mode, the RX signal processing block is able to, using the active blocks, to perform some limited operations (block 107). That is, in the FEP mode, the RX signal processing block (a) measures a received signal strength indicator (RSSI) value (operation 108). RSSI is a general term defined in the standard which indicates a signal strength of a wireless link. The RSSI value, for example, can be in a range of [−100, 0] dBm. Alternatively, other ranges can be used. The RX signal processing block can measure the RSSI value using a RF automatic gain control (AGC) scheme. The RX signal processing block (b) determines a received signal quality indicator (RSQI) value (operation 110). The RSQI value is a measure of signal quality of the wireless link. The RX signal processing block can determine the RSQI value using a result from an access code correlation operation, as described in more detail below. The RX signal processing block (c) detects if the data packet is random noise, directed for another Bluetooth® RX, or directed for this wireless device (RX) by decoding an access code in a preamble of the data packet (operation 112). A preamble, as used herein, refers to a portion of the data packet that precedes a data payload of the data packet. At block 114, the RX signal processing block determines whether the data packet is a valid packet. If not, the wireless device remains in the FEP mode, returning to block 106.

When the data packet is a valid packet at block 114, the processing device stores a record with the RSSI value and the RSQI value in a memory device. The RSSI value and the RSQI value can belong to a specified wireless link. That is, the record is associated with the wireless link established at block 102.

In one embodiment, as part of block 114, the processing logic performs an access code correlation in the phase domain. The processing logic can determine a correlation result by performing an access code correlation on an access code of the incoming data packet with one or more pre-defined access codes. The correlation result can indicate a pattern match when the incoming data packet is directed to the expected access code. For example, the correlator output for access code is given by equation (1) as follows:

$$C = \sum_{n=1}^{64} x(t-N) d(n) \quad (1)$$

where $d(n)$, $n=1, \ldots, 64$, indicates pre-defined 64-bit access code bits in a data packet (e.g., Bluetooth® packet), and $x(t)$ indicates the received signal. There must be a correlation peak in this waveform. Ideally, when there is a pattern match on an access code, C is at least higher than a certain value M (e.g., $M=32P$) and its maximum value is given by equation (2) as follows:

$$C_m = \sum_{n=1}^{64} |x(t-n)| = 64P \quad (2)$$

where P is the amplitude of $x(t)$ at the right time. When there is noise or interference, $C_m$ will deteriorate to a smaller value. So Cm can be in a range of [M, 64P]. When using the Bluetooth® technology, a threshold A (also referred to as a first threshold) can be defined to indicate where a strong signal is detected when the RSSI value is greater than the threshold A (e.g., RSSI>=A). For example, the threshold A can be defined as −60 dBm (e.g., A=−60 dBm). Alternatively, the threshold A can be set at other values. Similarly, a second threshold, threshold B, can be defined to differentiate a good correlation result from a poor correlation result. The RSQI value can be given by the following equation (3):

$$RSQI = C_m \quad (3)$$

When the RSQI value is greater than the second threshold, the RSQI value indicates a good signal quality.

At block 107, if the operation 112 indicates that the received packet is not valid (e.g., RSQI<M), the RX signal processing block determines that the data packet is either random noise or intended for another receiver. In this case, the wireless device can clear the RX signal processing block and continue with the FEP mode at block 106 until a valid packet is received or a designated time slot is over. At block 107, if the operation 112 indicates that the received packet is valid (e.g., RSQI≥M), the wireless device stores the RSSI and RSQI values at block 116. There could be multiple values collected from multiple packets (say, N packets) that are associated with the same link. These multiple values can be stored in a set of record in the memory device.

The wireless device can include processing logic that applies an average function on the RSSI values in the set of records to generate an average RSSI value and applies an average function on the RSQI values in the set of records to generate an average RSQI value (block 118). The average functions can eliminate any noise effect in the RSSI and RSQI values. The wireless device can include processing logic that categorizes the set of records for the transmission into one of multiple channel quality indicator (CQI) categories using the average RSSI value, the average RSQI value, and the first and second thresholds (block 120). An example of CQI categories is shown in a table of FIG. 2. Once categorized, the processing device includes processing logic that makes a power adjustment decision to configure the wireless device to operate in one of multiple power modes, each corresponding to each of the multiple CQI categories (block 122). Based on the power adjustment decision at block 122, the processing logic makes a power adjustment to the configuration settings at block 104.

Figure 2:
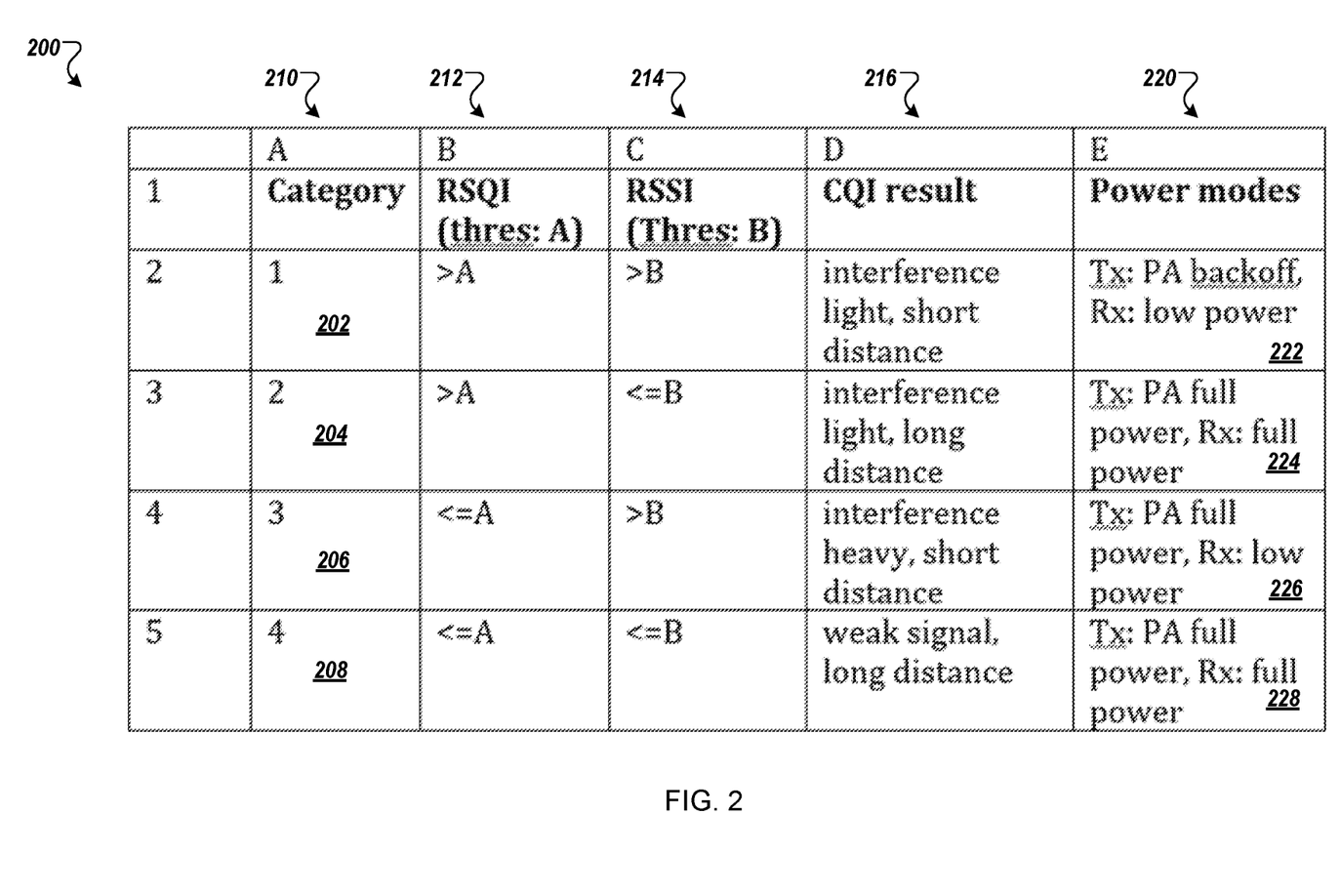
FIG. 2 is a table of channel quality indicator categories and corresponding power modes according power according to one embodiment.

FIG. 2 is a table 200 of channel quality indicator categories 210 and corresponding power modes 220 according power according to one embodiment. The wireless device can use a measured RSSI value, a measured RSSI value, and the table 200 to determine a channel situation of current communications. The channel situation is described in the CQI results 216 for each of the CQI categories 210. Using the determined CQI category, a power adjustment decision can be made, selecting one of the power modes 220. Table 200 is an example of CQI categories 210 and power modes 220.

In the depicted example, table 200 includes four CQI categories 210, including a first CQI category 202, a second CQI category 204, a third CQI category 206, and a fourth CQI category 208. A transmission of data received over the wireless link is categorized in the first CQI category 202 when the measured RSQI exceeds a first threshold 212 (threshold A) and the measured RSSI value exceeds a second threshold 214. The CQI result 216, falls into the first CQI category 202, it indicates a short-distance link without much interference. During payload processing, a first power mode 222 can be used in which the low power mode with all TX and RX signal processing blocks for transactions. In this case, the transmit power can be backed off and the RX RF block power can stay in a low-power mode. When CQI result 216 falls into the second CQI category 204, it indicates a long-distance link without much interference. During payload processing, a second power mode 224 can be used in which a normal power mode with all TX and RX signal processing blocks for transactions. In this case, TX power and RX power can be maximized. When CQI result 216 falls into the third CQI category 206, it indicates a short-distance link with interference. During payload processing, a third power mode 226 can be used in which the TX power is maximized, but RX blocks stay in low power with higher noise figure as interference is dominant regardless of noise. When CQI results 216 falls into the fourth CQI category 208, it indicates a long-distance link that is a weak link in a noisy environment. During payload processing, a fourth power mode 228 can be used in which TX and RX signal processing blocks will use the normal power mode with all TX and RX blocks for transactions. No low-power levels will be turned on in the fourth power mode 228. Alternatively, other CQI categories and corresponding power modes can be used. Once one of the power modes 220 is selected, the payload of the data packet is processed. Alternatively, a subsequent data packet is processed using the CQI result 216 determined from a previous packet.

In a further embodiment, the wireless device can monitor for an exit criteria which specifies that if (i) a predetermined number (e.g., K which is a programmable integer value) of physical packets that are processed in error (i.e., include erroneous information) or (ii) a second predetermined number of packets that include acknowledgment information (e.g, ACK packets) are not received when using low-power levels, the wireless device can force the TX and RX blocks back to normal settings regardless of the measured CQI result.

Figure 3:
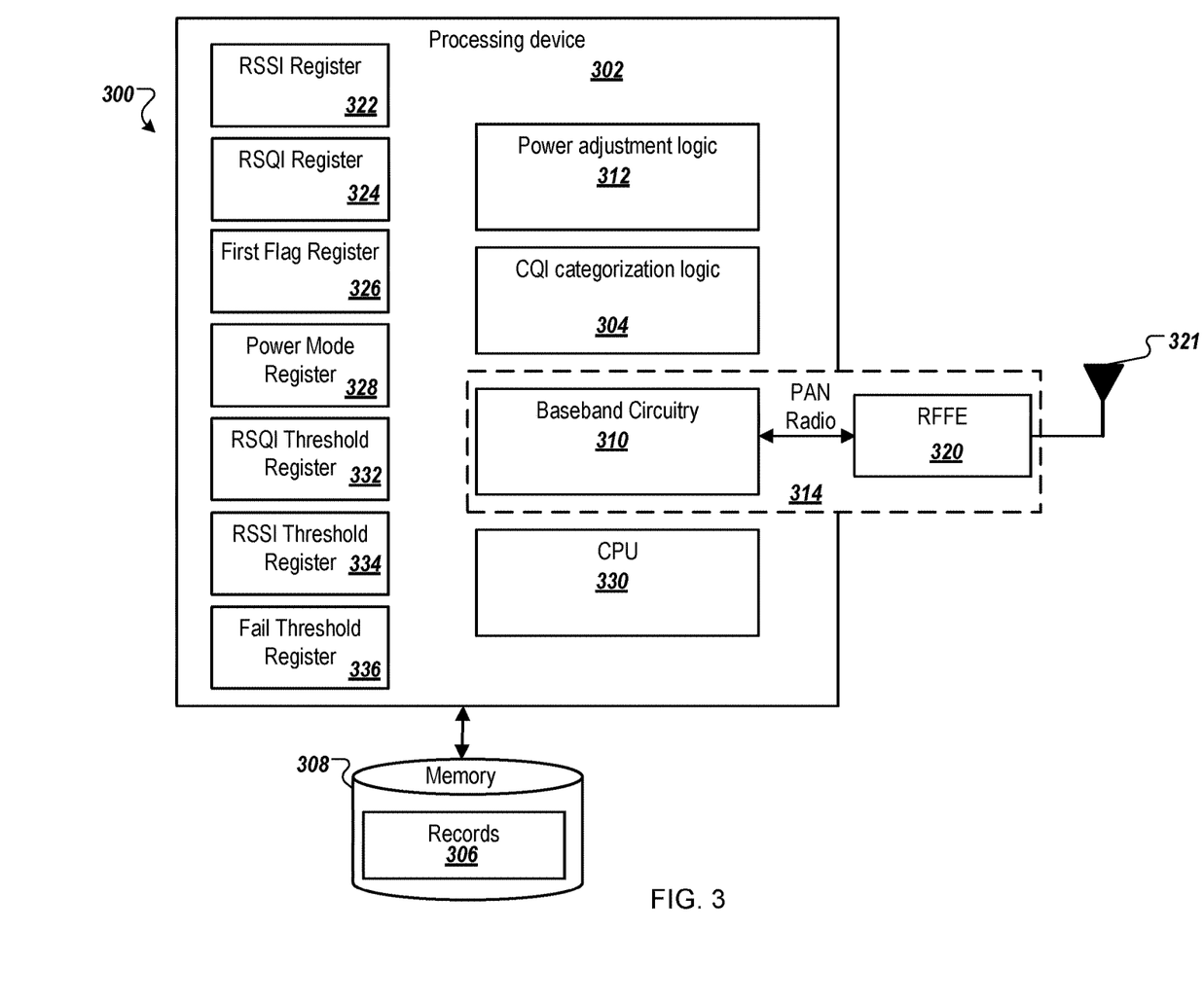
FIG. 3 is a block diagram of a wireless device with power adjustment categorization and decision logic according to one embodiment.

FIG. 3 is a block diagram of a wireless device 300 with power adjustment categorization and decision logic according to one embodiment. In the depicted embodiment, the wireless device 300 includes radio frequency front-end (RFFE) circuitry 320 that is coupled to one or more antenna(s) 321. The RFFE circuitry 320 can include an analog-to-digital converter (ADC) that converts RF signals, received via the one or more antennas 321, to digital data of one or more packet. The wireless device 100 also includes a memory device 308 and a processing device 302 coupled to the RFFE circuitry 320 and the memory device 308. The processing device 302 includes a radio transceiver 314, such as a personal area network (PAN) radio (e.g., Bluetooth® radio). The radio transceiver 314 can include the RFFE circuitry 320 and baseband circuitry 310.

As described above with respect to FIG. 1, the processing device 302 can include baseband circuitry 310 and power adjustment categorization and decision logic. The power adjustment categorization and decision logic can include CQI categorization logic 304 and power adjustment logic 312, as illustrated in FIG. 3.

The CPU 330 establishes a wireless link between the wireless device 300 and a second wireless device via the radio transceiver 314. The CPU 330 adopts a set of default settings to start a communication on the wireless link. The CPU 330 changes the set of default settings to operate in FEP mode where only the RFFE circuitry 320 (e.g., power amplifier, low noise amplifier (LNA), or the like) and a portion of the baseband circuitry 310 are powered on. The portion of the baseband circuitry 310 can include the access code detection signal processing block. Other portions of the baseband circuitry 310 can include the TX signal processing block, the RX signal processing block and these can be powered off. Furthermore, the CPU 330 or portions of the CPU can be powered off during the FEP mode. The FEP mode is a lower power mode than a full active power mode in which the RFFE circuitry 320, the access code detection signal processing block, the TX signal processing block, the RX signal processing block, and the CPU 330 are powered on and operate at full active power according to the set of default settings.

In the FEP mode, the baseband circuitry 310 can determine a RSSI value associated with a data packet received over the wireless link. The baseband circuitry 310 can determine a RSQI value through an access code correlation result in a phase domain. For example, baseband circuitry 310 can determine a correlation result by performing an access code correlation on an access code of the incoming data packet with a pre-defined access code. The correlation result can indicate a pattern match when the incoming data packet is directed to the wireless device 300. From the access code correlation, the baseband circuitry 310 can determine if the data packet is i) random noise, ii) designated for another wireless device, or iii) designated for this transceiver by the access code correlation result decoding an access code of the data packet. The baseband circuitry 310 can determine the RSQI value from the correlation result, such as described above. The baseband circuitry 310 can store the RSSI value and the RSQI value in a record in the memory device, the record being associated with the wireless link. For example, an identifier of the wireless link can be stored in the record with the RSSI value and the RSQI value. The identifier of the wireless link can operate as a key or an index for the record. The record can include additional information Alternatively, the CPU 330 can determine the RSSI and RSQI values and store the record in the memory device 308.

The CQI categorization logic 304 obtains the records 306 from the memory device 308 and determines, from multiple CQI categories, a CQI category for a set of packets sent on the wireless link between the wireless device 300 and the second wireless device. The set of packets includes the data packet. Each record 306 can include a RSSI value, a RSQI value, and at least an identifier of the wireless link. Each record 306 can include additional details, as described herein. The power adjustment logic 312 transitions from the FEP mode to a first power mode of multiple power modes, responsive to a determination of the CQI category. Each of the multiple power modes corresponding to one of the multiple CQI categories and each of the multiple power modes includes a set of settings that are lower power than the set of default settings. In the first power mode, the baseband circuitry 310 and the CPU 330 can process a subsequent data packet received over the wireless link. Alternatively, the baseband circuitry 310 and the CPU 330 can process a subsequent portion of the data packet, such as the payload of the data packet, while in the first power mode.

In a further embodiment, the CPU 330 determines that a number of packets that are processed in error or no ACKs are observed when in one of the lower power modes (i.e., when the set of settings are used instead of the set of default settings). The CPU 330 can transition from the first power mode or from any of the multiple power modes into the full active power mode with the set of default settings, responsive to the number of packets being processed in error.

In another embodiment, the wireless device 100 includes a radio transceiver (e.g., PAN radio) that is configured to establish a wireless link between the processing device 302 and a second device. The baseband circuitry 310 is coupled to the radio transceiver. The baseband circuitry 310 is configured to determine that a data packet, received over the wireless link via the radio transceiver, is directed to the processing device 302 by processing a preamble of the data packet while the baseband circuitry 310 is in a first power mode. That is, the baseband circuitry 310 consumes less power in the first power mode than in a maximum power mode of the processing device 302. The baseband circuitry 310 is configured to determine a RSQI value associated with the data packet and determine a RSSI value associated with the data packet. The baseband circuitry 310 is configured to store a record with the RSSI value and the RSQI value in memory, the record being associated with the wireless link. The CPU 330 is configured to determine, while the CPU is in the first power mode, a second power mode for the baseband circuitry 310 and the CPU 330 to process a payload of the data packet by categorizing a set of records 306 associated with the wireless link. The CPU 330 consumes less power in the first power mode than in the maximum power mode. The CPU 330 process the payload of the data packet while the CPU 330 is in the second power mode. The baseband circuitry 310 is further configured to process the payload of the data packet while the baseband circuitry 310 is in the second power mode.

In a further embodiment, the CPU 330 is further configured to generate an average RSSI value by performing an average function on RSSI values in the set of records 306. That is, the CPU 330 can determine an average RSSI value using the RSSI value of the incoming data packet and one or more historical RSSI values associated with the wireless link. The historical RSSI values can be stored in the records 306. The CPU 330 is further configured to generate an average RSQI value by performing an average function on RSQI values in the set of records 306. That is, the CPU 330 can determine an average RSQI value using the RSQI value of the incoming data packet and one or more historical RSQI values associated with the wireless link. The historical RSQI values can be stored in the records 306. The CQI categorization logic 304 (or logic executed by the CPU 330) categorizes the set of records 306 in a first category based on results of a comparison of the average RSSI value and a first threshold and a comparison of the average RSQI value and a second threshold. For example, the CQI categorization logic 304 can determine, from a set of CQI categories, a CQI category for data sent on the wireless link by comparing the average RSSI value against a first threshold and comparing the average RSQI value against a second threshold. The CQI category corresponds to a result of the comparisons.

In one embodiment, the results of the comparisons include the average RSSI value being greater than the first threshold and the average RSQI value being greater than the second threshold. In this case, the first CQI category is indicative of a distance between the wireless device and the second wireless device being that is less than a threshold distance and an interference on the wireless link being less than an interference threshold. In this case, the power adjustment logic 312 (or logic executed by the CPU 330) is further configured to control the radio transceiver to operate at a first power level in the second power mode, the first power level being less than a maximum power level of the radio transceiver. The power adjustment logic 312 (or logic executed by the CPU 330) is further configured to control the baseband circuitry 310 to operate at a second power level in the second power mode, the second power level being less than a maximum power level of the baseband circuitry 310.

The power adjustment logic 312 (or logic executed by the CPU 330) is further configured to control the CPU 330 to operate at a third power level in the second power mode, the third power level being less than a maximum power level of the CPU. 310.

In another embodiment, the results of the comparisons include the average RSSI value being less than or equal to the first threshold and the average RSQI value being greater than the second threshold. In this case, the first CQI category is indicative of a distance between the wireless device and the second wireless device being that is greater than a threshold distance and an interference on the wireless link being less than an interference threshold. In this case, the power adjustment logic 312 (or logic executed by the CPU 330) is further configured to control the radio transceiver to switch from a first power level in a first power mode to a maximum power level of the radio transceiver in the second power mode, the first power level being less than the maximum power level of the radio transceiver. The power adjustment logic 312 (or logic executed by the CPU 330) is further configured to control the baseband circuitry 310 to switch from a second power level in the first power mode to a maximum power level of the baseband circuitry 310 in the second power mode, the second power level being less than the maximum power level of the baseband circuitry 310. The power adjustment logic 312 (or logic executed by the CPU 330) is further configured to control the CPU 330 to switch from a third power level in the first power mode to a maximum power level of the CPU 330 in the second power mode, the third power level being less than the maximum power level of the CPU 330.

In another embodiment, the results of the comparisons include the average RSSI value being greater than the first threshold and the average RSQI value being less than or equal to the second threshold. In this case, the first CQI category is indicative of a distance between the wireless device and the second wireless device being that is less than a threshold distance and an interference on the wireless link being greater than an interference threshold. The power adjustment logic 312 (or logic executed by the CPU 330) is further configured to control the radio transceiver to operate at a first power level in the second power mode, the first power level being less than a maximum power level of the radio transceiver. The power adjustment logic 312 (or logic executed by the CPU 330) is further configured to control a TX signal processing block to switch from a second power level in the first power mode to a maximum power level of the baseband circuitry 310 in the second power mode, the second power level being less than the maximum power level of the baseband circuitry 310. The power adjustment logic 312 (or logic executed by the CPU 330) is further configured to control a RX signal processing block to operate at the second power level in the second power mode. The power adjustment logic 312 (or logic executed by the CPU 330) is further configured to control the CPU 330 to operate at a third power level in the second power mode, the third power level being less than a maximum power level of the CPU 330.

In one embodiment, the results of the comparisons include the average RSSI value being less than or equal to the first threshold and the average RSQI value being less than or equal to the second threshold. In this case, the first CQI category is indicative of a distance between the wireless device and the second wireless device being that is greater than a threshold distance and an interference that greater than an interference threshold. The power adjustment logic 312 (or logic executed by the CPU 330) is further configured to control the radio transceiver to switch from a first power level in the first power mode to a maximum power level of the radio transceiver in the second power mode, the first power level being less than the maximum power level of the radio transceiver. The power adjustment logic 312 (or logic executed by the CPU 330) is further configured to control the baseband circuitry 310 to switch from a second power level in the first power mode to a maximum power level of the baseband circuitry 310 in the second power mode, the second power level being less than the maximum power level of the baseband circuitry 310. The power adjustment logic 312 (or logic executed by the CPU 330) is further configured to control the CPU 330 to switch from a third power level in the first power mode to a maximum power level of the CPU 330 in the second power mode, the third power level being less than the maximum power level of the CPU 330.

In another embodiment, the CPU 330 is further configured to receive a first set of data packets from the second wireless device over the wireless link and process the first set of data packets. The CPU 330 is configured to send a second set of data packets to the second wireless device over the wireless link. The CPU 330 is configured to determine that (i) a first predetermine number data packets include erroneous information, or (ii) a second predetermined number of data packets that include acknowledgement information are not received when in the second power mode. The CPU 330 configures the wireless device 300 to operate in a maximum power mode, responsive to the determining that that the first number of the first set of data packets contain errors or the second number of ACKs are not received when in the second power mode.

In a further embodiment, the processing device 302 includes multiple registers, including, for example: i) a multi-bit register 322 (RSSI register) for the baseband circuitry 310 to write a current RSSI value at the end of packet so that the CQI categorization logic 304 (e.g., firmware) can read it later for processing and resetting this register; ii) a multi-bit register 324 (RSQI register) for the baseband circuitry 310 to write a current RSQI at the end of packet so that the CQI categorization logic 304 (e.g., firmware) can read it later for processing and resetting this register; iii) a one-bit first flag register 326 (a first valid flag register) for the baseband circuitry 310 to write a one-bit flag to indicate if the RSSI/RSQI value in the aforementioned registers are valid so that the CQI categorization logic 304 (e.g., firmware) can understand if it needs to fetch the RSSI/RSQI values for this packet; iv) a two-bit register 328 (power mode register) that is written by the CQI categorization logic 304 (e.g., firmware) so that baseband circuitry 310 (or modem) can understand what power mode to choose from for both TX and RX modes; v) a multi-bit register 332 (RSQI threshold register) that represents a first threshold (threshold A) for RSQI; vi) a multi-bit register 334 (RSSI threshold register) that represents a second threshold (threshold B) for RSSI; and vii) a multi-bit register 336 (fail threshold register) that represents a threshold (K), which is a threshold number of consecutive packets to fail.

It should be noted that once the CQI categorization logic 304 (e.g., firmware) is done with reading the current RSSI/RSQI values from the registers 322, 324, the CQI categorization logic 304 (e.g., firmware) can reset the registers 322, 324. The baseband circuitry 310 is configured to write RSSI estimate to the RSSI register 322. The baseband circuitry 310 can compute the RSQI value and write it to the RSQI register 324. The baseband circuitry 310 can write a valid indicator to the first flag register 326. The baseband circuitry 310 can read a power mode indicator from the power mode register 328. The baseband circuitry 310 can adjust the RF and baseband bias voltage and power level to switch to the desired power mode.

In one embodiment, the CPU 330 executes firmware, software, or any combination thereof. The software/firmware of the CPU 330 can perform a designated algorithm, such as a smoothing algorithm, an averaging and categorizing algorithm, or the like, to determine an optimized power mode for the TX and RX blocks for the next period. The software/firmware of the CPU 330 can include a function to update and maintain the recorded RSSI/RSQI for each associated link. The software/firmware of the CPU 330 can include a function to track and determine if any single record of CFO estimate is an outliner and remove it from smoothing process. The software/firmware of the CPU 330 can include a function to erase the existing and updated estimate per request.

Figure 4:
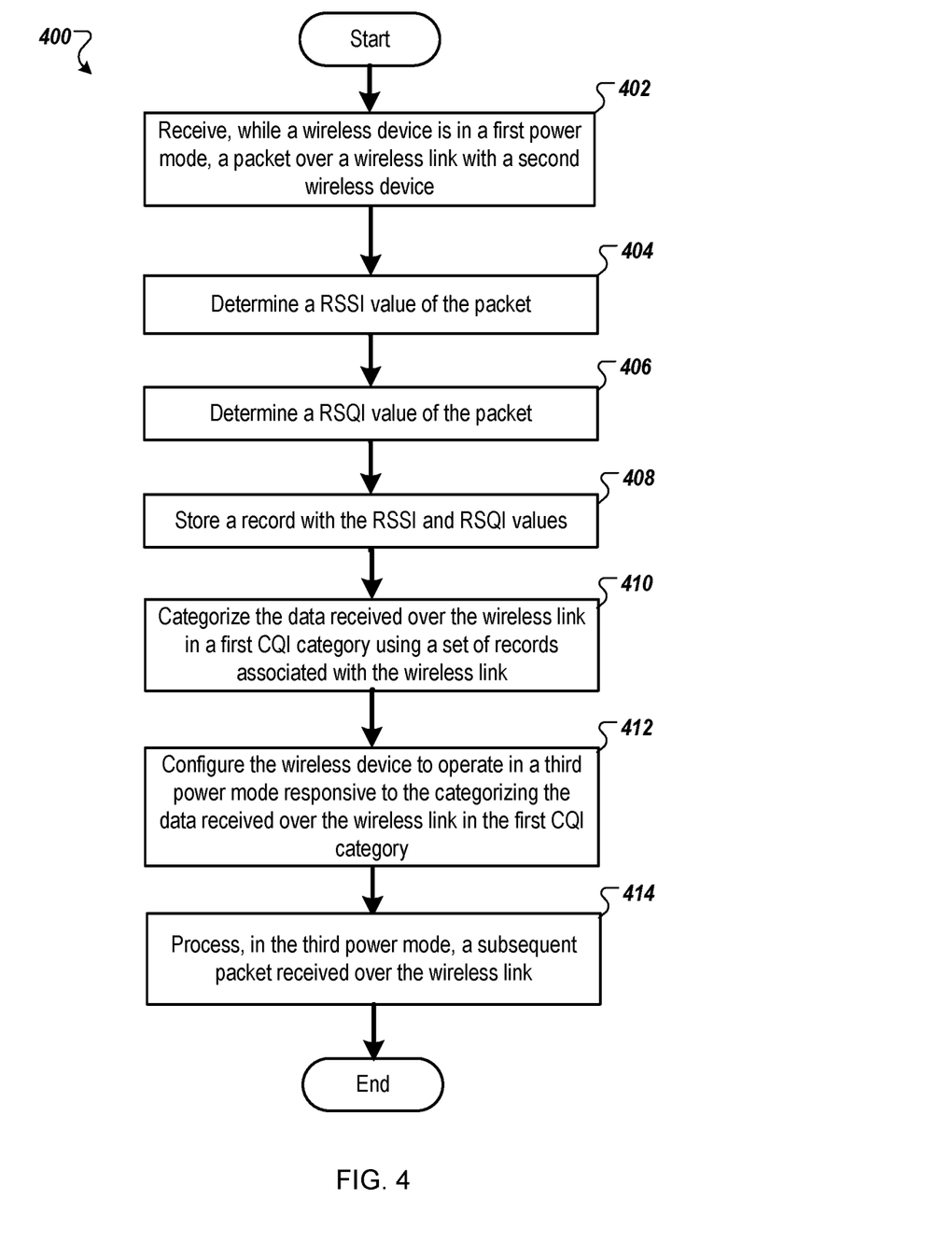
FIG. 4 is a flow diagram of a method of categorizing and adjusting power modes according to one embodiment.

FIG. 4 is a flow diagram of a method of categorizing and adjusting power modes according to one embodiment. The method 400 may be performed by processing logic that comprises hardware (e.g., circuitry, dedicated logic, programmable logic, microcode, etc.), software, firmware, or a combination thereof. In one embodiment, the method 400 may be performed by any of the processing devices described herein and illustrated with respect to FIGS. 1-3.

Referring back to FIG. 4, the method 400 begins by the processing logic receiving, in a first power mode, a data packet over a wireless link between the wireless device and a second wireless device (block 402). The first power mode is lower in power mode than a second power mode (e.g., a maximum power mode) of the wireless device. The processing logic determines, in the first power mode, a RSSI value associated with the data packet (block 404). The processing logic determines a RSQI value from a result of an access code correlation of a preamble of the data packet in a phase domain (block 406). The processing logic stores a record with the RSSI value and the RSQI value in a memory device of the wireless device (block 408). The record is associated with the wireless link. The processing logic categorizes the data received over the wireless link in a first CQI category using a set of records, stored in the memory device and associated with the wireless link (block 410). The set of records includes the record. In one embodiment, the processing logic determines an average RSSI value from the set of records and determines an average RSQI value from the set of records, the set of records including the record and each of the set of records including an RSSI value and a RSQI value previously determined by the wireless device. The processing logic categorizes data received over the wireless link in a first CQI category using the average RSSI value and the average RSQI value. The processing logic configures the wireless device to operate in a third power mode, responsive to the categorizing the data received over the wireless link in the first CQI category (block 412). The third power mode can be lower in power or equal in power to the second power mode, as described herein. The processing logic processes, in the third power mode, a subsequent data packet received over the wireless link (block 414); and the method 400 ends.

In a further embodiments, the processing logic receives a second data packet over the wireless link and determines whether i) the second data packet is directed to the wireless device, ii) the second data packet is directed to another wireless device, or iii) the second data packet is random noise. The processing logic, responsive to a determination that i) the second data packet is directed to the wireless device, performs storing a second record with a second RSSI value and a second RSQI value associated with the wireless link. Or, responsive to a determination that ii) the second data packet is directed to another wireless device or random noise, the processing logic remains in the first power mode without performing the storing the second record and configuring the wireless device to operate in the third power mode.

In a further embodiments, the processing logic generates an average RSSI value by performing an average function on RSSI values in the set of records and generates an average RSQI value by performing an average function on RSQI values in the set of records. The processing logic categorizes the set of records in the first CQI category by comparing the average RSSI value against a first threshold, comparing the average RSQI value against a second threshold, and categorizing the set of records in the first CQI category based on results of the comparisons. The first threshold can represent a specified signal strength level for the wireless link, such as to distinguish between a short distance and a long distance. The second threshold can represent a specified quality level for the wireless link, such as to distinguish between a good quality level for the wireless link and a poor quality level for the wireless link.

In one embodiment, responsive to the average RSSI value being greater than the first threshold and the average RSQI value being greater than the second threshold, the first CQI category is indicative of a distance between the wireless device and the second wireless device being that is less than a threshold distance and an interference on the wireless link being less than an interference threshold. The processing logic configures the wireless device to operate in the third power mode by: setting RFFE circuitry to operate at a first power level that is less than a default power level specified by a wireless standard; setting a TX signal processing block to operate at the first power level that is less than the default power level; setting a RX signal processing block to operate at the first power level that is less than the default power level; and setting a CPU to operate at the first power level that is less than the default power level.

In a further embodiments, responsive to the average RSSI value being less than or equal to the first threshold and the average RSQI value being greater than the second threshold, the first CQI category is indicative of a distance between the wireless device and the second wireless device being that is greater than a threshold distance and an interference on the wireless link being less than an interference threshold. The processing logic configures the wireless device to operate in the third power mode by: setting RFFE circuitry to operate at a default power level specified by a wireless standard; setting a transmit (TX) signal processing block to operate at the default power level; setting a RX signal processing block to operate at the default power level; and setting a CPU to operate at the default power level.

In a further embodiments, responsive to the average RSSI value being greater than the first threshold and the average RSQI value being less than or equal to the second threshold, the first CQI category is indicative of a distance between the wireless device and the second wireless device being that is less than a threshold distance and an interference on the wireless link being greater than an interference threshold. The processing logic configures the wireless device to operate in the third power mode by: setting RFFE circuitry to operate at a first power level that is less than a default power level specified by a wireless standard; setting a TX processing block to operate the default power level; setting a RX signal processing block to operate at the first power level that is less than the default power level; and setting a CPU to operate at the first power level that is less than the default power level.

In a further embodiments, responsive to the average RSSI value being less than or equal to the first threshold and the average RSQI value being less than or equal to the second threshold, the first CQI category is indicative of a distance between the wireless device and the second wireless device being that is greater than a threshold distance and an interference that greater than an interference threshold. The processing logic configures the wireless device to operate in the third power mode by: setting RFFE circuitry to operate at a default power level specified by a wireless standard; setting a TX signal processing block to operate at the default power level; setting a RX signal processing block to operate at the default power level; and setting a CPU to operate at the default power level.

In a further embodiments, the processing logic receives, in the first power mode, the subsequent data packet over the wireless link. The first power mode is a FEP mode for processing a preamble of the subsequent data packet. In the FEP mode, only RFFE circuitry, the CPU, and access code detection signal processing block are powered on and a TX signal processing block and a RX signal processing block are powered off. The processing logic performs, by the access code detection signal processing block, a correlation result by performing an access code correlation on an access code of the subsequent data packet with a pre-defined access code, the correlation result indicating that the subsequent data packet is directed to the wireless device. This can be done in the phase domain. As described herein, the processing logic determines that the subsequent data packet is directed to the wireless device. Responsive to the determining that the subsequent data packet is directed to the wireless device and that the data received is still categorized in the first CQI category, the processing logic configures the wireless device to operate in the third power mode for processing of a payload of the subsequent data packet and processes, in the third power mode, the payload of the subsequent data packet.

In a further embodiments, the processing logic receives, in the third power mode, a first set of data packets from the second wireless device over the wireless link and processes the first set of data packets. The processing logic sends, in the third power mode, a second set of data packets to the second wireless device over the wireless link. The processing logic determines that a first number of the first set of data packets contain errors or a second number of ACKs, excepted to be received in response to the second set of data packets, are not received. The processing logic configures the wireless device to operate in the second power mode, responsive to the determining that that the first number of the first set of data packets contain errors or the second number of ACKs are not received.

In a further embodiments, the processing logic receives, in the first power mode, the subsequent data packet over the wireless link. The first power mode is a FEP mode for processing a preamble of the subsequent data packet. In the FEP mode, only RFFE circuitry, the CPU, and access code detection signal processing block are powered on and a TX signal processing block and a RX signal processing block are powered off. The processing logic performs, by the access code detection signal processing block, an access code correlation in a phase domain on the preamble of the subsequent data packet. The processing logic determines a correlation result by performing an access code correlation on an access code of the subsequent data packet with a pre-defined access code, the correlation result indicating that the subsequent data packet is not directed to the wireless device. Responsive to the determining that the subsequent data packet is not directed to the wireless device, the processing logic configures the wireless device to continue to operate in the first power mode.

In a further embodiments, the processing logic receives, in the first power mode, the subsequent data packet over the wireless link. The first power mode is a FEP mode for processing a preamble of the subsequent data packet. In the FEP mode, only RFFE circuitry, the CPU and access code detection signal processing block are powered on and a TX signal processing block and a RX signal processing block are powered off. The processing logic performs, by the access code detection signal processing block, an access code correlation in a phase domain on the preamble of the subsequent data packet. The processing logic determines a correlation result by performing an access code correlation on an access code of the subsequent data packet with a pre-defined access code, the correlation result indicating that the subsequent data packet is random noise. Responsive to the determining that the subsequent data packet is random noise, the processing logic configures the wireless device to continue to operate in the first power mode.

Figure 5:
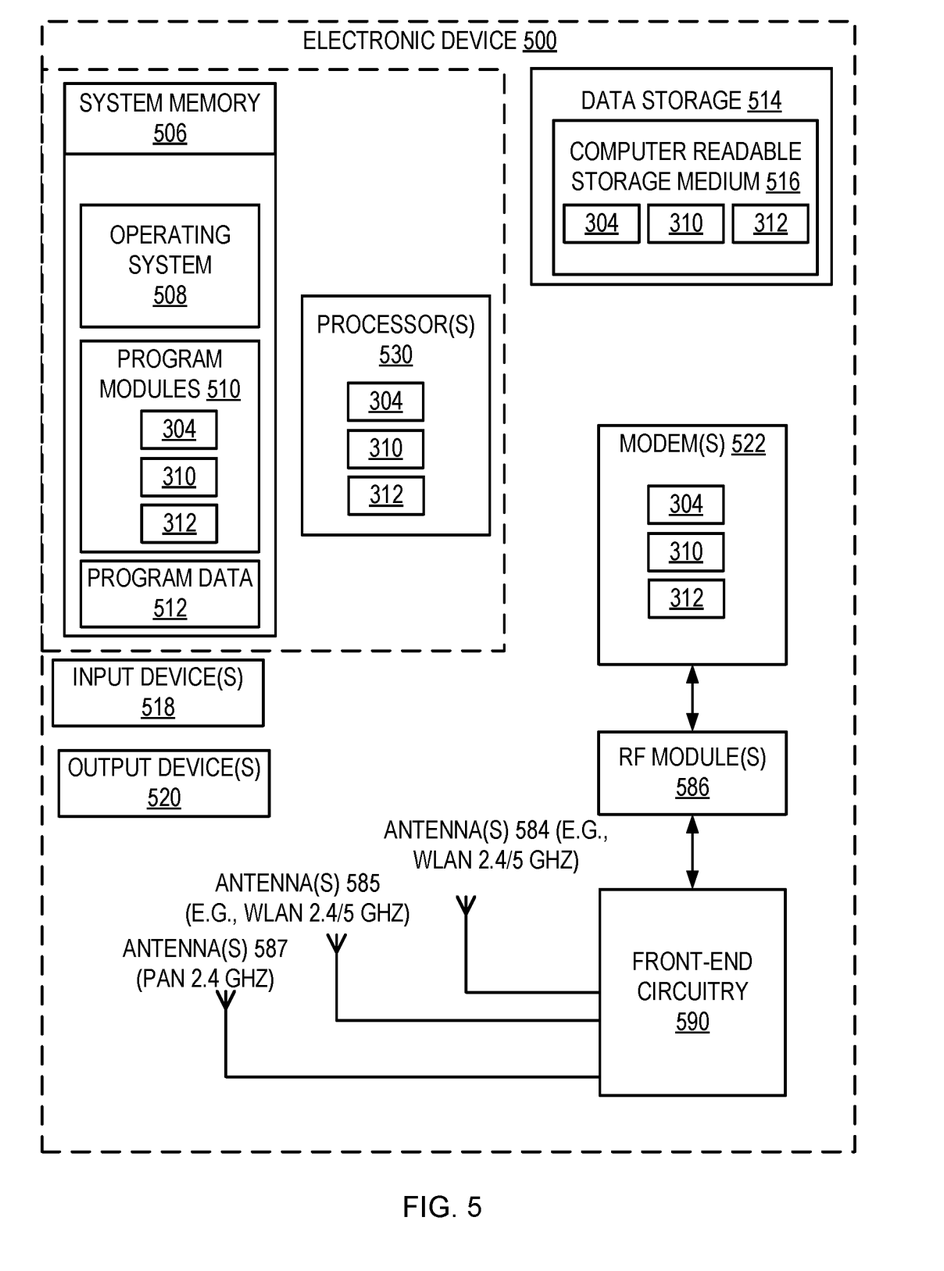
FIG. 5 is a block diagram of an electronic device that can be configured to categorize and adjust power modes as described herein according to one embodiment.

FIG. 5 is a block diagram of an electronic device 500 that can be configured to categorize and adjust power modes as described herein according to one embodiment. The electronic device 500 may correspond to the electronic devices described above with respect to FIGS. 1-5. In one embodiment, the electronic device 500 is the wireless device 100 of FIG. 1. In another embodiment, the electronic device 500 is the wireless device 100 of FIG. 2. In one embodiment, the electronic device 500 is the processing device 302 of FIG. 3 or the wireless device 300 of FIG. 3. Alternatively, the electronic device 500 may be other electronic devices, as described herein.

The electronic device 500 includes one or more processor(s) 530, such as one or more CPUs, microcontrollers, field programmable gate arrays, or other types of processors. The electronic device 500 also includes system memory 506, which may correspond to any combination of volatile and/or non-volatile storage mechanisms. The system memory 506 stores information that provides operating system component 508, various program modules 510, program data 512, and/or other components. In one embodiment, the system memory 506 stores instructions of methods to control operation of the electronic device 500. The electronic device 500 performs functions by using the processor(s) 530 to execute instructions provided by the system memory 506. In one embodiment, the program modules 510 may include power adjustment categorization and decision logic that may perform some or all of the operations described herein, such as the method 400 of FIG. 4, or any processes described herein. The power adjustment categorization and decision logic may perform some or all of the operations described herein to categorize and adjust power modes. The program modules 510 may also include the baseband logic 310 that perform similar operations as the baseband circuitry described herein.

The electronic device 500 also includes a data storage device 514 that may be composed of one or more types of removable storage and/or one or more types of non-removable storage. The data storage device 514 includes a computer-readable storage medium 516 on which is stored one or more sets of instructions embodying any of the methodologies or functions described herein. Instructions for the program modules 510 (e.g., CQI categorization logic 304, power adjustment logic 312, baseband logic 310, or any combination thereof) may reside, completely or at least partially, within the computer-readable storage medium 516, system memory 506 and/or within the processor(s) 530 during execution thereof by the electronic device 500, the system memory 506 and the processor(s) 530 also constituting computer-readable media. The electronic device 500 may also include one or more input devices 518 (keyboard, mouse device, specialized selection keys, etc.) and one or more output devices 520 (displays, printers, audio output mechanisms, etc.).

The electronic device 500 further includes a modem 522 to allow the electronic device 500 to communicate via a wireless connections (e.g., such as provided by the wireless communication system) with other computing devices, such as remote computers, an item providing system, and so forth. The modem 522 can be connected to one or more radio frequency (RF) modules 586. The RF modules 586 may be a WLAN module, a WAN module, wireless personal area network (WPAN) module, Global Positioning System (GPS) module, or the like. The antenna structures (antenna(s) 584, 585, 587) are coupled to the front-end circuitry 590, which is coupled to the modem 1022. The front-end circuitry 590 may include radio front-end circuitry, antenna switching circuitry, impedance matching circuitry, or the like. The antennas 584 may be GPS antennas, Near-Field Communication (NFC) antennas, other WAN antennas, WLAN or PAN antennas, or the like. The modem 522 allows the electronic device 500 to handle both voice and non-voice communications (such as communications for text messages, multimedia messages, media downloads, web browsing, etc.) with a wireless communication system. The modem 522 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 522 may generate signals and send these signals to antenna(s) 584 of a first type (e.g., WLAN 5 GHz), antenna(s) 585 of a second type (e.g., WLAN 2.4 GHz), and/or antenna(s) 587 of a third type (e.g., WAN), via front-end circuitry 590, and RF module(s) 586 as descried herein. Antennas 584, 585, 587 may be configured to transmit in different frequency bands and/or using different wireless communication protocols. The antennas 584, 585, 587 may be directional, omnidirectional, or non-directional antennas. In addition to sending data, antennas 584, 585, 587 may also receive data, which is sent to appropriate RF modules connected to the antennas. One of the antennas 584, 585, 587 may be any combination of the antenna structures described herein.

In one embodiment, the electronic device 500 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 522 is shown to control transmission and reception via antenna (584, 585, 587), the electronic device 500 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
   a transceiver comprising radio frequency front-end (RFFE) circuitry, a first signal processing block, a transmit (TX) signal processing block, and a receive (RX) signal processing block;
   a memory device; and
   a central processing unit (CPU) coupled to the transceiver and the memory device, wherein the CPU:
      establishes a wireless link between the wireless device and a second wireless device;
      adopts a set of default settings to start communication on the wireless link; and
      changes the set of default settings to operate in a front-end processing (FEP) mode where only the CPU, the RFFE circuitry and the first signal processing block are powered on and the TX signal processing block and the RX signal processing block are powered off, wherein, in the FEP mode,
         the first signal processing block determines a received signal strength indicator (RSSI) value associated with an incoming data packet,
         the first signal processing block determines a correlation result by performing an access code correlation on an access code of the incoming data packet with a pre-defined access code, the correlation result indicating a pattern match;
         the first signal processing block determines, from the correlation result, a received signal quality indicator (RSQI) value associated with the packet,
         the CPU determines an average RSSI value using the RSSI value and a set of one or more historical RSSI values associated with the wireless link;
         the CPU determines an average RSQI value using the RSQI value and a set of one or more historical RSQI values associated with the wireless link;
         the CPU determines, from a plurality of channel quality indicator (CQI) categories, a first CQI category for data sent on the wireless link by comparing the average RSSI value against a first threshold and comparing the average RSQI value against a second threshold; and
         the CPU transitions from the FEP mode to a first power mode of a plurality of power modes, responsive to a determination of the first CQI category, each of the plurality of power modes corresponding to one of the plurality of CQI categories and each of the plurality of power modes comprises a set of different power levels that are equal to or lower in power than the set of default settings, and
      in the first power mode, the CPU processes a subsequently received data packet.

2. The wireless device of claim 1, wherein, in the first power mode, the CPU further:
   receives a first plurality of data packets from the second wireless device over the wireless link;
   processes the first plurality of data packets;
   sends a second plurality of data packets to the second wireless device over the wireless link;
   determines that (i) a first predetermine number data packets, of the plurality of data packets, include erroneous information, or (ii) a second predetermined number of data packets, of the first plurality of data packets, that include acknowledgement information are not received, wherein the second number of data packets correspond to the second plurality of data packets; and
   transitions from the first power mode into a full active power mode with the set of default settings, responsive to a determination of (i) or (ii).

3. A method comprising:
   receiving, by a wireless device in a first power mode, a data packet over a wireless link between the wireless device and a second wireless device, the first power mode being lower in power than a second power mode of the wireless device;
   determining, by the wireless device in the first power mode, a received signal strength indicator (RSSI) value associated with the data packet;
   determining, by the wireless device, a received signal quality indicator (RSQI) value associated with the data packet;
   storing a record with the RSSI value and the RSQI value in a memory device of the wireless device, the record being associated with the wireless link;
   determining, by the wireless device, an average RSSI value from a set of records, stored in the memory device and associated with the wireless link, the set of records comprising the record and each of the set of records comprising an RSSI value and a RSQI value previously determined by the wireless device;
   determining, by the wireless device, an average RSQI value from the set of records;
   categorizing, by the wireless device, data received over the wireless link in a first channel quality indicator (CQI) category using the average RSSI value and the average RSQI value;
   configuring the wireless device to operate in a third power mode, responsive to the categorizing the data received over the wireless link in the first CQI category, the third power mode being lower in power or equal in power to the second power mode; and
   processing, by the wireless device in the third power mode, a subsequent data packet received over the wireless link.

4. The method of claim 3, further comprising:
   receiving, by the wireless device in the first power mode, a second data packet over the wireless link;
   determining, by the wireless device, whether i) the second data packet is directed to the wireless device, or ii) the second data packet is directed to another wireless device;
   responsive to a determination that the second data packet is directed to the wireless device, performing storing a second record with a second RSSI value and a second RSQI value associated with the wireless link and configuring the wireless device to operate in the third power mode; or responsive to a determination that the data packet is directed to another wireless device, remaining in the first power mode without performing the storing the second record and configuring the wireless device to operate in the third power mode.

5. The method of claim 3, wherein the categorizing the data in the first CQI category comprises:

comparing the average RSSI value against a first threshold, the first threshold representing a specified signal strength level for the wireless link;

comparing the average RSQI value against a second threshold, the second threshold representing a specified quality level for the wireless link; and categorizing the data in the first CQI category based on results of the comparisons.

6. The method of claim 5, wherein (i) the average RSSI value is greater than the first threshold and (ii) the average RSQI value is greater than the second threshold, wherein the first CQI category is indicative of (iii) a distance between the wireless device and the second wireless device is less than a threshold distance and (iv) an interference on the wireless link is less than an interference threshold, and wherein configuring the wireless device to operate in the third power mode comprises:

setting radio frequency front-end (RFFE) circuitry to operate at a first power level that is less than a default power level specified by a wireless standard for the RFFE circuitry;

setting a transmit (TX) signal processing block to operate at a second power level that is less than a default power level specified by the wireless standard for the TX signal processing block;

setting a receive (RX) signal processing block to operate at a third power level that is less than a default power level specified by the wireless standard for the RX signal processing block; and setting a central processing unit (CPU) to operate at a fourth power level that is less than a default power level specified by the wireless standard for the CPU.

7. The method of claim 5, wherein the (i) the average RSSI value is less than or equal to the first threshold and (ii) the average RSQI value is greater than the second threshold, wherein the first CQI category is indicative (iii) a distance between the wireless device and the second wireless device is greater than a threshold distance and (iv) an interference on the wireless link is less than an interference threshold, and wherein configuring the wireless device to operate in the third power mode comprises:

setting radio frequency front-end (RFFE) circuitry to operate at a default power level specified by a wireless standard for the RFFE circuitry;

setting a transmit (TX) signal processing block to operate at a default power level specified by the wireless standard for the TX signal processing block;

setting a receive (RX) signal processing block to operate at a default power level specified by the wireless standard for the RX signal processing block; and setting a central processing unit (CPU) to operate at a default power level specified by the wireless standard for the CPU.

8. The method of claim 5, wherein (i) the average RSSI value is than the first threshold, (ii) the average RSQI value is less than or equal to the second threshold, wherein the first CQI category is indicative of (iii) a distance between the wireless device and the second wireless device is less than a threshold distance and (iv) an interference on the wireless link is greater than an interference threshold, and wherein configuring the wireless device to operate in the third power mode comprises:

setting radio frequency front-end (RFFE) circuitry to operate at a first power level that is less than a default power level specified by a wireless standard for the RFFE circuitry;

setting a transmit (TX) signal processing block to operate a default power level specified by the wireless standard for the TX signal processing block;

setting a receive (RX) signal processing block to operate at a second power level that is less than a default power level specified by the wireless standard for the RX signal processing block; and setting a central processing unit (CPU) to operate at a third power level that is less than a default power level specified by the wireless standard for the CPU.

9. The method of claim 5, wherein (i) the average RSSI value is less than or equal to the first threshold and (ii) the average RSQI value is less than or equal to the second threshold, wherein the first CQI category is indicative of (iii) a distance between the wireless device and the second wireless device is greater than a threshold distance and (iv) an interference on the wireless link is greater than an interference threshold, and wherein configuring the wireless device to operate in the third power mode comprises:

setting radio frequency front-end (RFFE) circuitry to operate at a default power level specified by a wireless standard for the RFFE circuitry;

setting a transmit (TX) signal processing block to operate at a default power level specified by the wireless standard for the TX signal processing block;

setting a receive (RX) signal processing block to operate at a default power level specified by the wireless standard for the RX signal processing block; and setting a central processing unit (CPU) to operate at a default power level specified by the wireless standard for the CPU.

10. The method of claim 3, further comprising:

receiving, by the wireless device in the first power mode, the subsequent data packet over the wireless link, wherein, in the first power mode, only a central processing unit CPU), radio frequency front-end (RFFE) circuitry, and detection first signal processing block are powered on and a transmit (TX) signal processing block and a receive (RX) signal processing block are powered off;

determining, by the first signal processing block, a correlation result by performing an access code correlation on an access code of the subsequent data packet with a pre-defined access code, the correlation result indicating that the subsequent data packet is directed to the wireless device;

responsive to the determining that the subsequent data packet is directed to the wireless device and that the data received over the wireless link is categorized in the first CQI category, configuring the wireless device to operate in the third power mode; and processing, by the wireless device in the third power mode, a payload of the subsequent data packet.

11. The method of claim 3, further comprising:

receiving, by the wireless device in the third power mode, a first plurality of data packets from the second wireless device over the wireless link;

processing, by the wireless device, the first plurality of data packets;

sending, by the wireless device in the third power mode, a second plurality of data packets to the second wireless device over the wireless link;

determining that (i) a first predetermine number data packets, of the plurality of data packets, include erroneous information, or (ii) a second predetermined number of data packets, of the first plurality of data packets, that include acknowledgement information are not received, wherein the second number of data packets correspond to the second plurality of data packets; and configuring the wireless device to operate in the second power mode, responsive to the determining (i) or (ii).

12. The method of claim 3, further comprising:

receiving, by the wireless device in the first power mode, the subsequent data packet over the wireless link, wherein, in the first power mode, only radio frequency front-end (RFFE) circuitry, a central processing unit (CPU), and detection first signal processing block are powered on and a transmit (TX) signal processing block and a receive (RX) signal processing block are powered off;

determining, by the first signal processing block, a correlation result by performing an access code correlation on an access code of the subsequent data packet with a pre-defined access code, the correlation result indicating that the subsequent data packet is not directed to the wireless device; and responsive to the determining that the subsequent data packet is not directed to the wireless device, configuring the wireless device to continue to operate in the first power mode.

13. The method of claim 3, further comprising:

receiving, by the wireless device in the first power mode, the subsequent data packet over the wireless link, wherein, in the first power mode, only radio frequency front-end (RFFE) circuitry, the CPU and detection first signal processing block are powered on and a transmit (TX) signal processing block and a receive (RX) signal processing block are powered off;

determining, by the first signal processing block, a correlation result by performing an access code correlation on an access code of the subsequent data packet with a pre-defined access code, the correlation result indicating that the subsequent data packet is random noise;

responsive to the determining that the subsequent data packet is random noise; and responsive to the determining that the subsequent data packet is random noise, configuring the wireless device to continue to operate in the first power mode.

14. A processing device comprising:

a radio transceiver configured to establish a wireless link between the processing device and a second device;

baseband circuitry coupled to the radio transceiver, wherein the baseband circuitry is configured to:
  determine that a data packet, received over the wireless link via the radio transceiver, is directed to the processing device by processing a preamble of the data packet while the baseband circuitry is in a first power mode, the baseband circuitry consuming less power in the first power mode than in a second power mode of the processing device;
  determine a received signal quality indicator (RSQI) value associated with the data packet;
  determine a received signal strength indicator (RSSI) value associated with the data packet; and
  store a record with the RSSI value and the RSQI value in memory, the record being associated with the wireless link; and a central processing unit (CPU) coupled to the baseband circuitry, wherein the CPU is configured to:
  categorize data previously received over the wireless link in a first category based on historical RSQI values and historical RSSI values associated with the wireless link;
  determine a second power mode corresponding to the category;
  configure the baseband circuitry and the CPU to operate in the second power mode; and
  process the payload of the data packet while the CPU is in the second power mode, wherein the baseband circuitry is further configured to process the payload of the data packet while the baseband circuitry is in the second power mode.

15. The processing device of claim 14, wherein the CPU is further configured to:

generate an average RSSI value by performing an average function on the historical RSSI values;

generate an average RSQI value by performing an average function on the historical RSQI values; and categorize the data previously received over the wireless link in the first category based on results of a comparison of the average RSSI value and a first threshold and a comparison of the average RSQI value and a second threshold.

16. The processing device of claim 15, wherein (i) the average RSSI value is greater than the first threshold and (ii) the average RSQI value is greater than the second threshold, wherein the first category is indicative of (iii) a distance between the wireless device and the second wireless device is that is less than a threshold distance and (iv) an interference on the wireless link is less than an interference threshold, and wherein the CPU is further configured to:

control the radio transceiver to operate at a first power level in the second power mode, the first power level being less than a maximum power level of the radio transceiver;

control the baseband circuitry to operate at a second power level in the second power mode, the second power level being less than a maximum power level of the baseband circuitry; and control the CPU to operate at a third power level in the second power mode, the third power level being less than a maximum power level of the CPU.

17. The processing device of claim 15, wherein (i) the average RSSI value is less than or equal to the first threshold and (ii) the average RSQI value is greater than the second threshold, wherein the first category is indicative of (iii) a distance between the wireless device and the second wireless device is that is greater than a threshold distance and (iv) an interference on the wireless link is less than an interference threshold, and wherein the CPU is further configured to:

control the radio transceiver to switch from a first power level in the first power mode to a maximum power level of the radio transceiver in the second power mode, the first power level being less than the maximum power level of the radio transceiver;

control the baseband circuitry to switch from a second power level in the first power mode to a maximum power level of the baseband circuitry in the second power mode, the second power level being less than the maximum power level of the baseband circuitry; and control the CPU to switch from a third power level in the first power mode to a maximum power level of the CPU in the second power mode, the third power level being less than the maximum power level of the CPU.

18. The processing device of claim 15, wherein (i) the average RSSI value is greater than the first threshold and (ii) the average RSQI value is less than or equal to the second threshold, wherein the first category is indicative of (iii) a distance between the wireless device and the second wireless device is that is less than a threshold distance and (iv) an interference on the wireless link is greater than an interference threshold, and wherein the CPU is further configured to:
  control the radio transceiver to operate at a first power level in the second power mode, the first power level being less than a maximum power level of the radio transceiver;
  control a transmit (TX) signal processing block to switch from a second power level in the first power mode to a maximum power level of the baseband circuitry in the second power mode, the second power level being less than the maximum power level of the baseband circuitry;
  control a receive (RX) signal processing block to operate at the second power level in the second power mode; and
  control the CPU to operate at a third power level in the second power mode, the third power level being less than a maximum power level of the CPU.

19. The processing device of claim 15, wherein (i) the average RSSI value is less than or equal to the first threshold and (ii) the average RSQI value is less than or equal to the second threshold, wherein the first category is indicative of (iii) a distance between the wireless device and the second wireless device is that is greater than a threshold distance and (iv) an interference on the wireless link is greater than an interference threshold, and wherein the CPU is further configured to:
  control the radio transceiver to switch from a first power level in the first power mode to a maximum power level of the radio transceiver in the second power mode, the first power level being less than the maximum power level of the radio transceiver;
  control the baseband circuitry to switch from a second power level in the first power mode to a maximum power level of the baseband circuitry in the second power mode, the second power level being less than the maximum power level of the baseband circuitry; and
  control the CPU to switch from a third power level in the first power mode to a maximum power level of the CPU in the second power mode, the third power level being less than the maximum power level of the CPU.

20. The processing device of claim 15, wherein, in the third power mode, the CPU is further configured to:
  receive a first plurality of data packets from the second wireless device over the wireless link;
  process the first plurality of data packets;
  send a second plurality of data packets to the second wireless device over the wireless link;
  determine that (i) a first predetermine number data packets, of the plurality of data packets, include erroneous information, or (ii) a second predetermined number of data packets, of the first plurality of data packets, that include acknowledgement information are not received, wherein the second number of data packets correspond to the second plurality of data packets; and
  configure the processing device to operate in a maximum power mode, responsive to a determination of (i) or (ii).

* * * * *